United States Patent
Anderson et al.

(10) Patent No.: US 10,334,165 B2
(45) Date of Patent: Jun. 25, 2019

(54) OMNISTEREO CAPTURE FOR MOBILE DEVICES

(71) Applicant: Google LLC, Mountain View, CA (US)

(72) Inventors: Robert Anderson, Seattle, WA (US); Steven Maxwell Seitz, Seattle, WA (US); Carlos Hernandez Esteban, Kirkland, WA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 15/723,670

(22) Filed: Oct. 3, 2017

(65) Prior Publication Data
US 2018/0048816 A1 Feb. 15, 2018

Related U.S. Application Data

(63) Continuation of application No. 14/721,612, filed on May 26, 2015, now Pat. No. 9,813,621.

(51) Int. Cl.
*G02B 27/01* (2006.01)
*H04N 5/232* (2006.01)
(Continued)

(52) U.S. Cl.
CPC ....... *H04N 5/23238* (2013.01); *G02B 27/017* (2013.01); *G06T 1/0007* (2013.01);
(Continued)

(58) Field of Classification Search
CPC ............. H04N 5/23238; H04N 13/221; H04N 5/23222; H04N 1/00183; H04N 5/23293;
(Continued)

(56) References Cited

U.S. PATENT DOCUMENTS

| 5,495,576 A | 2/1996 | Ritchey |
| 2004/0027451 A1 | 2/2004 | Baker |

(Continued)

FOREIGN PATENT DOCUMENTS

| CN | 103797443 A | 5/2014 |
| CN | 103907340 A | 7/2014 |

(Continued)

OTHER PUBLICATIONS

Richardt, et al., "Megastereo: Constructing High-Resolution Stereo Panoramas", International Conference on Computer Vision and Pattern Recognition, Jun. 2013, pp. 1-8.
(Continued)

*Primary Examiner* — Howard D Brown, Jr.
(74) *Attorney, Agent, or Firm* — Brake Hughes Bellermann LLP

(57) ABSTRACT

Systems and methods for capturing omnistereo content for a mobile device may include receiving an indication to capture a plurality of images of a scene, capturing the plurality of images using a camera associated with a mobile device and displaying on a screen of the mobile device and during capture, a representation of the plurality of images and presenting a composite image that includes a target capture path and an indicator that provides alignment information corresponding to a source capture path associated with the mobile device during capture of the plurality of images. The system may detect that a portion of the source capture path does not match a target capture path. The system can provide an updated indicator in the screen that may include a prompt to a user of the mobile device to adjust the mobile device to align the source capture path with the target capture path.

20 Claims, 9 Drawing Sheets

(51) Int. Cl.
*G09G 5/14* (2006.01)
*G06T 3/40* (2006.01)
*H04N 1/00* (2006.01)
*G06T 1/00* (2006.01)
*H04N 13/221* (2018.01)

(52) U.S. Cl.
CPC .............. *G06T 3/4038* (2013.01); *G09G 5/14* (2013.01); *H04N 1/00183* (2013.01); *H04N 5/23222* (2013.01); *H04N 5/23293* (2013.01); *H04N 13/221* (2018.05); *G06T 2200/32* (2013.01); *G06T 2207/30244* (2013.01)

(58) Field of Classification Search
CPC ............... G06T 1/0007; G06T 3/4038; G06T 2207/30244; G06T 2200/32; G02B 27/017; G09G 5/14
See application file for complete search history.

(56) References Cited

U.S. PATENT DOCUMENTS

| | | | |
|---|---|---|---|
| 2009/0138233 A1* | 5/2009 | Kludas | G01C 15/00 702/158 |
| 2009/0237403 A1* | 9/2009 | Horii | G06N 3/006 345/427 |
| 2012/0019614 A1 | 1/2012 | Murray et al. | |
| 2013/0083159 A1 | 4/2013 | Ooshima | |
| 2013/0155205 A1 | 6/2013 | Kosakai et al. | |
| 2013/0162786 A1 | 6/2013 | Kosakai et al. | |
| 2014/0099022 A1 | 4/2014 | McNamer et al. | |
| 2014/0156416 A1* | 6/2014 | Goenka | G06Q 30/0276 705/14.66 |
| 2014/0247325 A1 | 9/2014 | Wu et al. | |
| 2014/0267592 A1* | 9/2014 | Lee | H04N 5/23238 348/36 |
| 2014/0267618 A1 | 9/2014 | Esteban et al. | |
| 2015/0062289 A1 | 3/2015 | Cho et al. | |
| 2015/0124047 A1 | 5/2015 | Amira et al. | |
| 2015/0138313 A1* | 5/2015 | Kim | H04N 5/23238 348/36 |
| 2015/0156416 A1* | 6/2015 | Filip | H04N 5/23238 348/36 |
| 2015/0302633 A1 | 10/2015 | Li et al. | |
| 2016/0065842 A1* | 3/2016 | McCloskey | H04N 1/00129 348/36 |
| 2016/0353018 A1 | 12/2016 | Anderson et al. | |

FOREIGN PATENT DOCUMENTS

| | | |
|---|---|---|
| CN | 104040576 A | 9/2014 |
| EP | 2339863 A2 | 6/2011 |
| EP | 2779621 A1 | 9/2014 |
| EP | 2793187 A1 | 10/2014 |
| EP | 3304883 A1 | 4/2018 |
| JP | 2000032379 A | 1/2000 |
| JP | 2001094857 A | 4/2001 |
| JP | 2011076249 A | 4/2011 |
| JP | 2012068380 A | 4/2012 |
| JP | 2013030874 A | 2/2013 |
| KR | 20140147597 A | 12/2014 |
| KR | 20150011705 A | 2/2015 |
| KR | 20150031614 A | 3/2015 |
| WO | 2013069050 A1 | 5/2013 |
| WO | 2016191554 A1 | 12/2016 |

OTHER PUBLICATIONS

Firoozfam, et al., "A Conical Panoramic Stereo Imaging System for 3-D Scene Reconstruction", Proceedings of Oceans 2003, vol. 4, Sep. 22-26, 2003, pp. 2303-2308.
International Search Report and Written Opinion for PCT Application No. PCT/US2016/034317, dated Sep. 12, 2016, 18 pages.
Invitation to Pay Add'l Fees and Partial Search Report for PCT Application No. PCT/US2016/034317, dated Jul. 22, 2016, 7 Pages.
Peleg, et al., "Omnistereo: Panoramic Stereo Imaging", IEEE Transactions on Pattern Analysis and Machine Intelligence, vol. 23, No. 3, Mar. 2001, pp. 279-290.
Peleg, et al., "Stereo Mosaicing from a Single Moving Video Camera", Proceedings of SPIE vol. 4297, 2001, pp. 98-106.
Extended European Search Report for European Application No. 18185736.8, dated Aug. 20, 2018, 11 pages.
Ripton, JT, "Google Cardboard: everything you need to know", retrieved on Aug. 9, 2018 from: https://www.techradar.com/news/phone-and-communications/mobile-phones/google-cardboard-everything-you-need-to-know-1277738/2, XP055498697, Dec. 18, 2014, 7 pages.
U.S. Appl. No. 14/721,612, filed May 26, 2015, Allowed.

* cited by examiner

OMNISTEREO CAPTURE FOR MOBILE DEVICES

CROSS-REFERENCE TO RELATED APPLICATION

This application is a Continuation of, and claims priority to, U.S. patent application Ser. No. 14/721,612, filed on May 26, 2015, entitled "OMNISTEREO CAPTURE FOR MOBILE DEVICES", the disclosure of which is incorporated by reference herein in its entirety.

TECHNICAL FIELD

This description generally relates to generating omnistereo panoramas. In particular, the description relates to generating omnistereo panoramas from images captured on a mobile device.

BACKGROUND

Panoramic photography techniques can be used on images and video to provide a wide view of a scene. Conventionally, panoramic photography techniques and imaging techniques can be used to obtain panoramic images from a number of adjoining photographs taken with a conventional camera. The photographs can be mounted together in alignment to obtain a full panorama.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. In one general aspect, a computer-implemented method includes receiving, at a mobile device, an indication to capture a plurality of images of a scene, capturing the plurality of images using a camera associated with the mobile device, displaying on a screen of the mobile device and during capture of the plurality of images, a representation of the plurality of images and presenting, in the screen, a composite image that includes a target capture path and an indicator that provides alignment information corresponding to a source capture path associated with the mobile device during capture of the plurality of images. In response to detecting, during capture, that a portion of the source capture path does not match a portion of the target capture path, the match being based at least in part on a threshold condition, the method includes providing an updated indicator in the screen. The updated indicator may include a prompt, to a user of the mobile device, to adjust the mobile device to align the source capture path with the target capture path. Other embodiments of this aspect include corresponding computer systems, apparatus, and computer programs recorded on one or more computer storage devices, each configured to perform the actions of the methods.

In another general aspect, a computer-implemented method may include obtaining, at a computing device, images captured with a mobile device, the images including content captured from multiple points around a circular path. The method may also include adjusting, with the computing device, the images for rendering in 3D space. The adjusting may include determining at least one overlap between at least two of the images, the overlap including a match between pixels in the at least two images. The method may also include selecting, for each overlap, a portion of the pixels included in the overlap, combining the portions so that each portion of pixels is vertically aligned to generate a 3D segment of a scene, and in response to determining that there is not an overlap between the at least two images, generating additional image content to be placed between the at least two images by sampling a plurality of pixels from the at least two images and combining the additional image content to the 3D segment. The method may also include rendering, in a head-mounted display, the 3D segment as part of the scene. Other embodiments of this aspect include corresponding computer systems, apparatus, and computer programs recorded on one or more computer storage devices, each configured to perform the actions of the methods.

In another general aspect, a system may include at least one processor; memory storing instructions that, when executed by the at least one processor, cause the system to perform operations including capturing image content, the content displayed in a screen of a mobile device during capture, displaying, during capture, a pictorial graphic on the screen of the mobile device, the graphic configured to provide a target capture path and an indicator that provides alignment information corresponding to a source capture path associated with movement of the mobile device. The operations may also include in response to detecting, during image capture, that the source capture path associated with the movement of the mobile device is different than the target capture path, providing an updated indicator in the screen, the updated indicator including a prompt, to a user of the mobile device, to adjust the mobile device to match the source capture path to the target capture path. Other embodiments of this aspect include corresponding computer systems, apparatus, and computer programs recorded on one or more computer storage devices, each configured to perform the actions of the methods.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

The following disclosure describes a number of techniques that can be employed to capture and produce omnistereo panoramas on a mobile device. The mobile device can receive indications, notifications, or other communications about capturing image content. For example, an application running on the mobile device can notify a user, during capture, that an orientation of the device is askew or otherwise inaccurately capturing content. In response, the user can reorient the mobile device to correct the capture. Once a particular capture is completed, the algorithms described in this disclosure can provide 3D omnistereo images using captured content from the mobile device.

Figure 1:
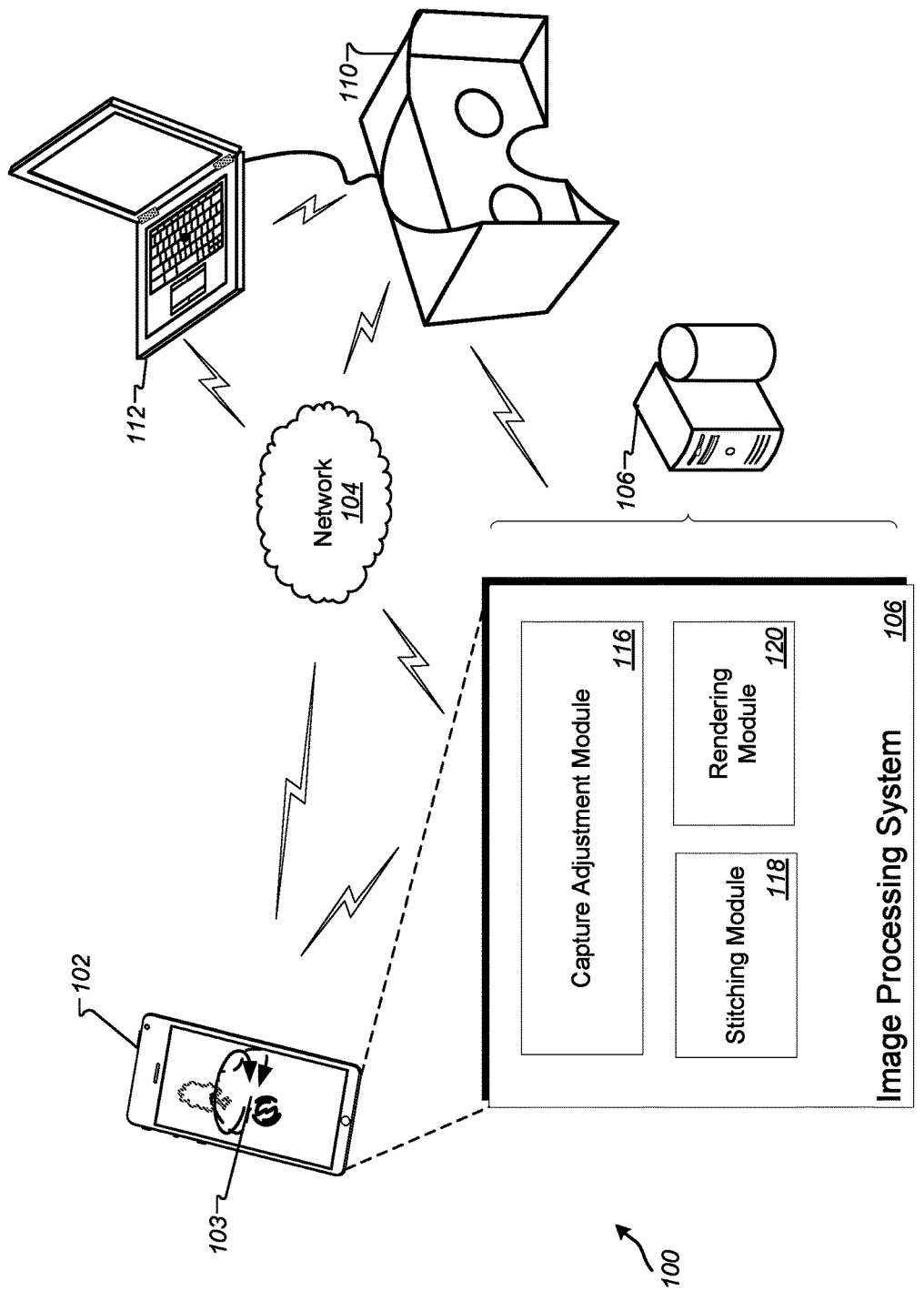
FIG. 1 is a block diagram of an example system for capturing and rendering stereoscopic images in a 3D virtual reality (VR) environment.

FIG. 1 is a block diagram of an example system 100 for capturing and rendering stereoscopic images in a 3D virtual reality (VR) environment. In the example system 100, a mobile device 102 can be used to capture images and/or video and provide those images or video over a network 104, or alternatively, can provide the images directly to an image processing system 106 for analysis and processing. In some implementations of system 100, the image processing system 106 is provided as part of mobile device 102. In other implementations, portions of image processing system 106 are provided on mobile device 102, while other portions of image processing system 106 are provided on another computing system.

The mobile device 102 may be a mobile phone, an electronic tablet, a laptop, a camera, or other such electronic device that may be used to obtain image data. In some implementations, the mobile device 102 can be configured to capture still images. In some implementations, the mobile device 102 can be configured to capture video and store such content as individual frames or video (e.g., .avi files) and such stored images can be uploaded to the Internet, another server or device, or stored locally on the device 102. In some implementations, incoming images can be stored as encoded images or video. In general, the images described throughout this disclosure may include a plurality of consecutive or non-consecutive image frames of a scene. In some implementations, the images described throughout this disclosure may include a combination of both consecutive sets of images and non-consecutive sets of images. The images may be captured in two or three dimensions.

In operation of device 102, a user can access a camera (also can be referred to as a capture device) on device 102, hold the device 102 in a selected orientation and pan or sweep the device 102 around to capture images along a capture path. In general, sweeping device 102 around to capture images along a capture path can include having the user move the device 102 around a circular capture path (or a capture path of another shape or profile) surrounding her head or body (or part of a body). In such a sweep, the device 102 may be directed outward away from the user and pointed toward scenery while the user follows the circular capture path (or a capture path of another shape or profile). In some implementations, the capture path can be disposed within, or aligned along, a single plane, can be curved, can have linear portions, can have one or more discontinuities, and/or so forth. In some implementations, the capture path can have portions that are disposed within, or aligned along, more than one plane.

While sweeping a path (e.g., a capture path) and capturing images, the mobile device 102 can receive indications to modify particular capture configurations. Capture configurations can include, but are not limited to, mobile device pose/capture positions/angles/pitch/roll/, camera settings for lighting/exposure, horizontal or vertical tilt or twist, speed of camera capture sweep, etc.

During image capture, the mobile device 102 can provide indications to a user capturing images to allow the user to make changes during the capture of the images. The indications may be instructions to modify the orientation and/or the angle at which the user is capturing images. In one example, the indications may be provided in a device 102 screen. In one example, the indications may be provided in the device 102 screen in addition to content being captured with the device 102. In a non-limiting example, the indications may be displayed overlaid on the content being captured to provide a composite image that illustrates the images being captured and indications for modifying capture configurations. In some implementations, the composite image can include the images being captured with the indications overlaid (e.g., overlaid in a visible fashion, transparently overlaid, semi-transparently overlaid) onto the images being captured. As shown on a screen of device 102, application content depicts an image capture application actively capturing images and receiving feedback regarding capture configuration by indications 103.

Once the images are captured, the image processing system 106 (or mobile device 102) can perform a number of processes on the images to generate 3D omnistereo images that can be provided to a head mounted display (HMD) device 110 for rendering over network 104, for example. In some implementations, the image processing system 106 can also provide the processed images to mobile device 102 and/or to computing device 112 for rendering, storage, or further processing.

The HMD device 110 may represent a virtual reality headset, glasses, eyepiece, or other wearable device capable of displaying virtual reality content. In operation, the HMD device 110 can execute a VR application (not shown) which can playback received and/or processed images to a user. In some implementations, the VR application can be hosted by one or more of the devices 102, 106, or 112, shown in FIG. 1. In one example, the HMD device 110 can provide a still representation and/or video playback of a scene captured by mobile device 102. In general, the playback may include images stitched into a 3D stereoscopic scene to provide a user with a realistic viewing of the scene.

In some implementations, multiple mobile devices can be used to capture images of the scene. For example, mobile device 102 may be one of many mobile devices arranged on a camera rig (not shown) to capture additional images of a particular scene. Such a camera rig can be configured for use as an image capture device and/or processing device to gather image data for rendering content in a VR environment, for example. The rig can include mobile devices configured with video cameras, image sensors, and/or infrared cameras, as well as processing circuitry to process captured images.

As shown in FIG. 1, the image processing system 106 includes a capture adjustment module 116, a stitching module 118, and a rendering module 120. The capture adjustment module 116 can be configured to provide instructions to a user to adjust for orientation and/or position of a mobile device during image capture. For example, if the mobile device 102 is held by a user at an angle that does not match a particular capture path, then the device 102 can provide graphics, instructions, or other communication on a display of the device.

In some implementations, the capture adjustment module 116 can provide content to an application running on mobile device 102. The content may be provided during image capture and can include pictorial graphics on the screen of the mobile device 102. In some examples, the pictorial graphics can be presented in the screen alongside, overlaid, superimposed, or otherwise combined with the images being captured and can be configured to provide a proposed capture path and an indicator that provides alignment information corresponding to a capture path associated with movement of the mobile device 102. The indicator that provides alignment information may be a correction indicator that provides text or graphics pertaining to directions that can assist a user to adjust the capture orientation or position of the mobile device 102. For example, a graphic depicting a proposed capture path can be overlaid by a graphic depicting an actual capture path being traversed by a sweeping motion of the mobile device 102. A user sweeping a path of a scene with the mobile device 102 can view these paths and attempt to manually adjust the mobile device orientation or position to match a portion of the actual capture path to a portion of the corresponding proposed capture path. In some implementations, the graphics can direct the user to re-sweep a particular portion of the scene along the capture path. For example, the graphics can direct the user to back up and retake portions of video. In another example, the graphics can direct the user to retake an entire sweep of the capture path of a particular scene. In such an example, the graphics or text alongside the graphics can indicate an angle of capture for the retake. In some examples, the graphics can direction the user to adjust camera configuration details before performing additional captures.

Configuration of a particular proposed capture path can be based on a detected orientation or angle of a camera associated with the mobile device 102. For example, mobile device 102 may include onboard accelerometers or gyroscope sensing devices (not shown) that can be used to determine the orientation or angle of the camera (e.g., camera associated with the mobile device 102. This information can be used to generate and provide a suggested/desired capture path. In some implementations, configuration of the proposed capture path can be based on the scene. For example, mobile device 102 can analyze a scene during capture to determine lighting, horizon placement, or field of view and can suggest a capture path or capture speed based on such information. In some implementations, configuration of the proposed capture path can be based on camera configurations or limitations. For example, mobile device 102 may capture images using one field of view with respect to a portrait orientation and another field of view with respect to landscape orientation. The capture path can be adapted accordingly. An application on mobile device can update and dynamically change the proposed capture path and can provide such changes in the screen of mobile device 102 in real time during capture.

For example, the application displaying the capture paths can detect, during image capture, that the capture path associated with the movement of the mobile device (e.g., the actual capture path) is different from the proposed capture path. If the application detects that the paths do not match, the application can provide an updated indicator to the mobile device 102. The updated indicator may include a prompt, a graphic, a sound, or text indicating to the user of the mobile device that an adjustment is requested. In some implementations, the capture adjustment module 116 can be configured to compensate for one or both of a non-circular camera trajectory during image capture and/or compensate for a non-parallel principal camera axis during image capture. Additional examples of such corrections are described in detail with reference to FIGS. 4-8.

In some implementations, the capture adjustment module 116 can be configured to correct images post-capture. For example, after images are captured, module 116 can compensate for a non-circular camera trajectory or sweep, a non-parallel principal (camera) axis, and/or an incorrect viewing-direction with respect to camera trajectory, just to name a few examples.

The stitching module 118 can be configured to blend or stitch two or more columns of pixels from several image frames to remove artifacts. Example artifacts include artifacts due to poor exposure (or exposure changes from image frame to image frame) and/or artifacts due to misalignment errors based on a pose associated with a mobile device camera. In some implementations, the module 118 can blend additional content in between two columns of pixels to provide missing content in image frames. In other implementations, the module 118 can blend additional content in between two columns to remove artifacts in the image frames.

In some implementations, the stitching module 118 can be configured to adjust captured images for rendering in 3D space by correcting for lateral roll movement that occurred during image capture. In some implementations, the stitching module 118 can be configured to adjust captured images for rendering in 3D space by correcting non-conformal camera arc movement that occurred during image capture. In some implementations, the stitching module 118 can be configured to adjust captured images for rendering in 3D space by correcting inconsistent radius measurements (related to the capture path) that occurred during image capture.

In some implementations, the stitching module 118 can determine which columns to stitch (e.g., blend) together. For example, module 118 can analyze captured image data to determine at least one overlap between at least two of the images. The overlap may include matched columns or regions of pixels from two images, for example. For each overlap found, the module 118 can select a portion of the matched pixels and combine them so that each portion is vertically aligned. The vertically aligned pixels can be combined to generate one segment of a 3D scene. In the event that no overlap is detected, the stitching module 118 can generate additional image content to be blended between the images. The stitched content can be rendered in a head-mounted display to display the content in a VR environment, for example.

In some implementations, the stitching module 118 can be configured to generate 3D stereoscopic images based on images obtained with mobile device 102. The stitching module 118 can be configured to blend pixels and/or image-strips from multiple image portions. In some implementations, blending can be based on flow fields as determined by an image interpolation component (not shown). For example, the stitching module 118 can be configured to determine flow fields (and/or flow vectors) between related pixels in adjacent images. Flow fields can be used to compensate for both transformations that images have undergone and for processing images that have undergone transformations. For example, flow fields can be used to compensate for a transformation of a particular pixel grid of a captured image. In some implementations, module 118 can generate, by interpolation of surrounding images, one or more images that are not part of the captured images, and can interleave the generated images into the captured images to generate additional virtual reality content for a scene adapted for display in a VR environment.

In some implementations, the stitching module 118 can estimate optical flow by adjusting particular images. The adjustments can include, for example, rectifying a portion of images, determining an estimated camera pose associated with the portion of images, and determining a flow between images in the portion. In some implementations, the stitching module 118 receives images depicting multiple sweeps of a particular capture path to capture images in a scene. The images corresponding to the multiple sweeps of the capture path can be stitched together to form a 3D stereoscopic view of the scene.

In the event that captured images of one or more sweeps of a capture path are not properly adapted to stitch into a scene that accurately represents a real world scene (without distortion or unwanted remnants), the systems described in this disclosure can adjust the images to accurately represent a real world scene. For example, when using a mobile device, such as mobile device 102, a capture path can vary dramatically depending on how a user holding the mobile device 102 manipulates the orientation of the device. As can be seen in the above figures, the capture path may be an arc or other shape representing a sweep of the capture path that is not well constrained. Device rotations, capture radius changes, roll, pitch, or yaw changes can all occur. The system 100 can adjust some or all captured image content by rendering the content in 3D space, selecting particular remnants of rays in the content, and stitching particular portions together to provide proper parallax and optical flow occurs.

In some implementations, the mobile device 102 can function as the image processing system 106. For example, in the event that combinations of particular images captured with device 102 do not provide an accurate 3D stereoscopic scene, the same device 102 can perform processing on such images to improve or correct the accuracy and rendering of any subsequently generated 3D stereoscopic scene. In particular, the mobile device 102 can be configured with an image processing system to optimize the captured images to provide an accurate rendering of a scene for presentation in a VR environment.

The optimization can include stitching together particular image frames. For example, during capture of images, the mobile device 102 can determine which columns of pixels in each captured image frame can be stitched together. The mobile device 102 can analyze the image frames to determine points/columns in which stitching would provide a cohesive scene. For each point/column that the mobile device 102 selects for stitching, device 102 can capture placement data for the points/columns and can linearly stitch appropriate points/columns together into a final image. Such optimizations can function to correct exposure inconsistencies, correct camera misalignment/pose errors, and/or correct for missing image frames.

Once the images are properly adjusted and stitched, the rendering module 120 can render the images into a realistic looking scene provided from a virtual viewpoint. For example, module 120 can render a collection of images captured by a mobile device and provide virtual reality content, based on those images, to a user in HMD device 110, for example. Rendered scenes can be based on images captured in a single circular sweep, a partial sweep, multiple sweeps of a scene, and/or at a number of pose positions, as described in detail in FIGS. 2-10.

The implementations described in this disclosure can provide one or more advantages. For example, the methods and systems described herein can use a limited field of view associated with a camera on a mobile device, to produce 3D omnistereo images by stitching together content from multiple capture events of a scene. In some implementations, images can be captured with a device having a vertical field of view of about 90 degrees and/or a horizontal field of view of about 90 degrees. In addition, the methods and systems described herein can ensure that particular content or angles in a scene are correctly captured by directing a user of the mobile device 102 to adjust the mobile device 102 in real-time (i.e., during capture of the scene) to monitor and control the camera path, orientation, and camera facing angle.

In the example system 100, the devices 106 and 112 may be a laptop computer, a desktop computer, a mobile computing device, or a gaming console. In some implementations, the devices 106 and 112 can be a mobile computing device that can be placed and/or otherwise located near or within the HMD device 110. The mobile computing device can include a display device that can be used as the screen for the HMD device 110, for example. Devices 102, 106, and 112 can include hardware and/or software for executing a VR application. In addition, devices 102, 106, and 112 can include hardware and/or software that can recognize, monitor, and track 3D movement of the HMD device 110, when these devices are placed in front of or held within a range of positions relative to the HMD device 110. In some implementations, devices 102, 106, and 112 can provide additional content to HMD device 110 over network 104. In some implementations, devices 102, 106, 110, and 112 can be connected to/interfaced with one or all of each other either paired or connected through network 104. The connection can be wired or wireless. The network 104 can be a public communications network or a private communications network.

The system 100 may include electronic storage. The electronic storage can include non-transitory storage media that electronically stores information. The electronic storage may be configured to store captured images, obtained images, pre-processed images, post-processed images, etc. Images captured with any of the disclosed cameras or devices can be processed and stored as one or more streams of video, or stored as individual frames. In some implementations, storage can occur during capture and rendering can occur directly after portions of images are captured to enable faster access to stereoscopic image content earlier than if capture and processing were concurrent.

Figure 2:
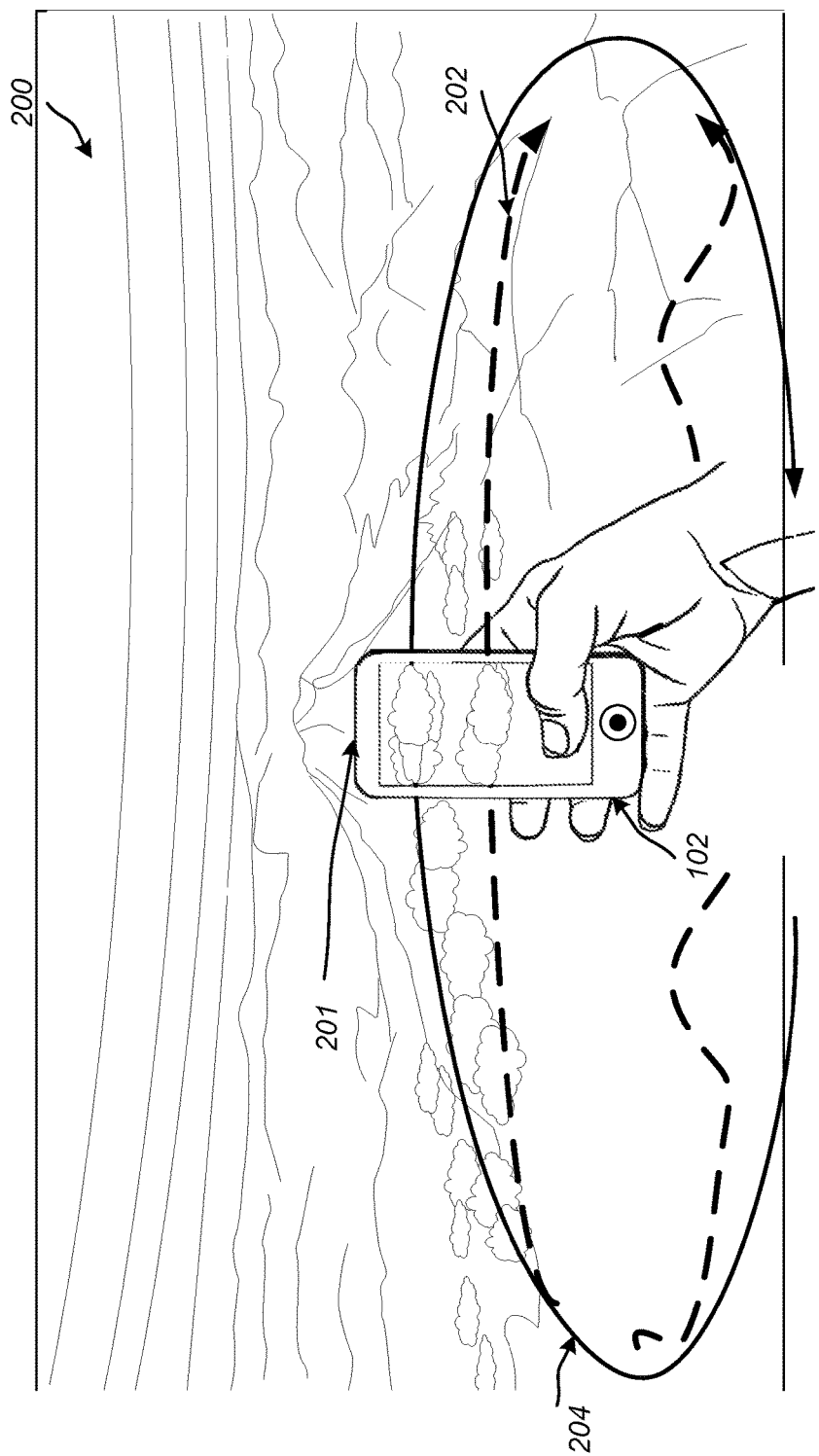
FIG. 2 is a diagram depicting an example of a mobile device capturing a panoramic view.

FIG. 2 is a diagram depicting an example of a mobile device capturing a panoramic view. Here, the mobile device may be mobile device 102 (FIG. 1). In this example, the user may be actively capturing a view of a scene 200 using onboard camera 201. In general, camera 201 points away from a user on the opposite side of a screen of device 102. Portions of the scene are displayed on the device 102 screen as the capture is occurring. The screen can be updated with new scenery as the user sweeps the device 102 across the scene 200.

In the depicted example, the user is holding mobile device 102 in a vertical (e.g., portrait) orientation and sweeping the device 102 along a capture path 202. In some implementations, the device 102 can be held horizontally (e.g., in a landscape orientation) or anywhere in the x-y-z plane along a 180 degree range to capture a scene facing a camera associated with the mobile device 102. The user can sweep around a circular path around her body by sweeping her arm or moving her entire body in a portion of a circle, a semi-circle or full circle. The user can move the mobile device 102 at varying speeds and can change speeds mid-sweep.

As shown in FIG. 2, the capture path 202 includes a number of jogs or bumps indicating a path that the user traversed, as the user swept the device 102 to capture the scene 200. In addition, a proposed path 204 is provided to indicate to the user an example of a well-aligned path. Capture path 204 is shown as a smooth (e.g., continuous) circular path that can be used to capture images at the same direction and tilt throughout a sweep of the scene 200.

Since the sweeping motions used to capture images with a mobile device 102 are generally manual operations performed by a user, several modifications can be made to images captured using a path other than the proposed path 204, such as capture path 202. These modifications can correct images captured in a non-uniform way. In addition, the vertical orientation of the phone may provide a different field of view than a horizontal orientation and as such, additional modifications can be made to correct captured images with a narrow field of view.

In a non-limiting example, the capture path 202 may be represented as the circumference of a circular-shaped space in which mobile device 102 can sweep around path 202 while capturing images with the onboard camera (e.g., 201). Capturing the images may correspond to recording image content with the mobile device 102 by aligning the mobile device 102 to traverse the capture path.

Figure 3:
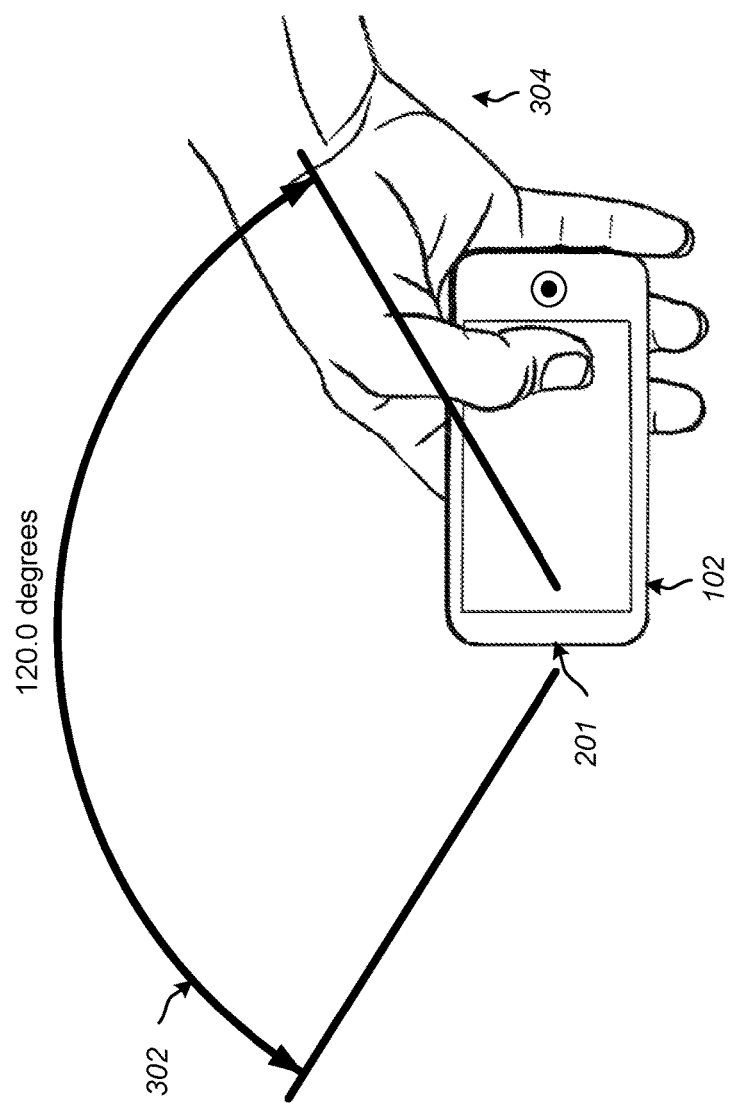
FIG. 3 is a diagram depicting an example mobile device capturing images of a scene in a field of view.

FIG. 3 is a diagram depicting an example mobile device capturing images of a scene in a field of view. Here, the mobile device may be mobile device 102 (FIG. 1). In this example, the user may be actively capturing (e.g., with onboard camera 201) a view of a scene with a specific field of view angle 302. The field of view 302 shown here is about 120 degrees. Other fields of view are possible as typical mobile devices include onboard cameras that may provide for smaller or larger fields of view depending on the camera specifications.

In the depicted example, a user 304 is holding mobile device 102 in a horizontal orientation (e.g., landscape orientation) and preparing to sweep device 102 along a capture path (not shown). Holding the mobile device 102 in a landscape orientation can allow for capture of images with a wider horizontal camera field of view than if the device 102 were to be held vertical, as shown in FIG. 2. However, the vertical field of view can be narrower when holding the device in a landscape orientation. Depending on the scene, the device orientation can be suggested by the application providing capture suggestions on device 102.

In a non-limiting example, a field of view associated with the mobile device 102 can be about 100 degrees to about 120 degrees. Systems described herein can compensate to construct images that approximate a field of view of about 180 degrees. For example, the system 100 can invoke a user to perform multiple sweeps of a particular capture path to capture images of a scene using device 102. The multiple sweeps can be stitched together using stitching module 118, for example, to provide images that appear to have been captured using a larger field of view.

Figure 4:
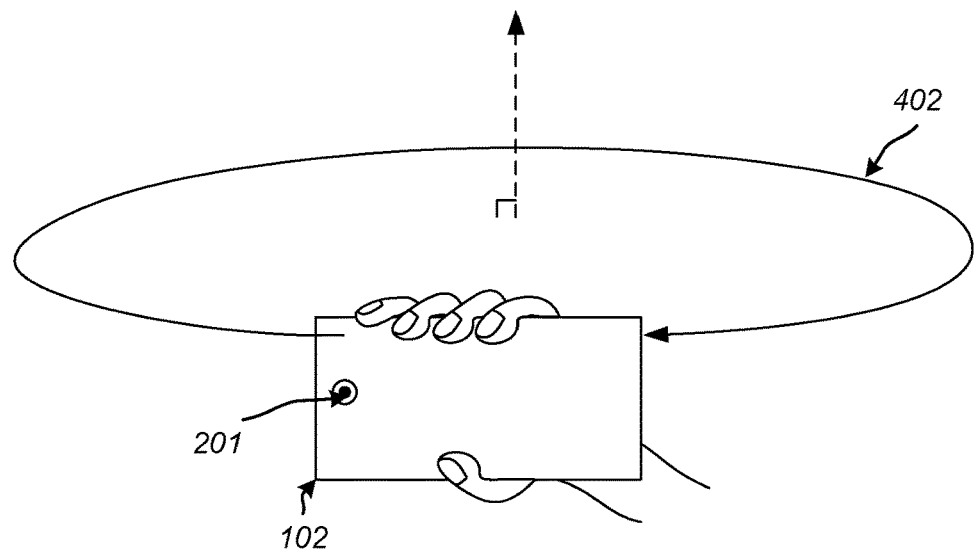
FIG. 4 is a diagram depicting an example path for capturing images with a mobile device.

FIG. 4 is a diagram depicting an example path 402 for capturing images with a mobile device. The capture path 402 shown here may be represented as the circumference of a circular-shaped space in which mobile device 102 can sweep around while capturing images with the onboard camera 201, for example. A user holding a mobile device (such as mobile device 102) can hold the device 102 horizontally with the bottom of the device (i.e., bottom rim of an onboard camera lens) held at a 90 degree tilt and level to a ground plane inferred by the flat circular path 402. The mobile device 102 is shown facing outward toward a scene to capture image content from zero degrees to 360 degrees around the capture path 402. A user 404 can sweep her arm horizontally or turn her body to carry out image capture along the depicted capture path 402.

Figure 5:
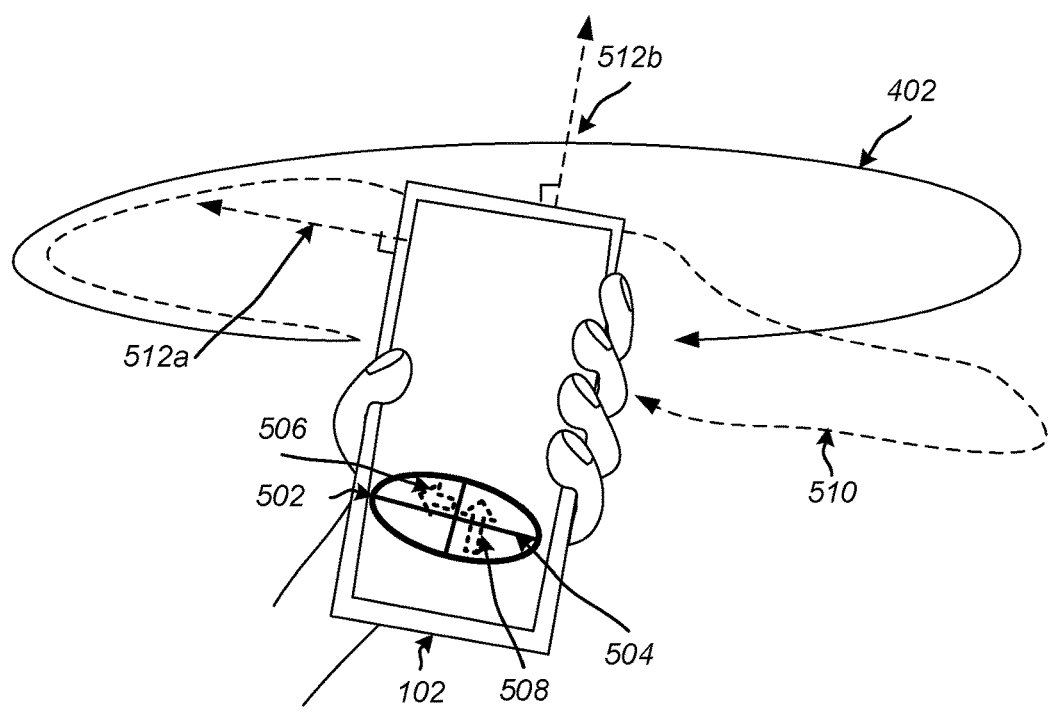
FIG. 5 is a diagram depicting an example of capturing images with a mobile device.

FIG. 5 is a diagram depicting another example path for capturing images with a mobile device. In this example, the mobile device (e.g., mobile device 102) is held by a user in a portrait orientation and includes application content 502. The application content 502 includes functionality to provide instructions to the user to correct a device orientation, direction, or tilt to properly capture images when performing a sweep of the path 402, for example.

As shown in FIG. 5, application content 502 includes a pictorial navigation display 504 that uses directional arrows 506 and 508 to signify to a user of device 102 to move, tilt, or direct the camera on device 102 in a different way. Here, the device 102 is shown as using a capture path 510 that does not match the circular capture path 402. The application content 504 may be provided during image sweep (i.e., capture). In this example, the mobile device 102 may have received the pictorial navigation display 504 with arrow indicators 506 and 508 to prompt the user modify the orientation and tilt of device 102 to better align the current capture path 510 with the suggested capture path 402. The indications may be provided in a screen on mobile device alongside, near, over, or transparently (e.g., semi-transparently) over the image content being captured with the mobile device 102. For example, the indications can be provided in a composite image of the semi-transparent indications overlaid onto the image content. Such a configuration can provide the advantage of allowing the user to view the image content being captured as well as any guided instructions to alter the capture path or procedure.

In a non-limiting example, the indications shown in pictorial display 504 may provide a graphical illustration of gyroscope measurements (taken by device 102) corresponding to movement in an angle of position of the mobile device 102. In some implementations, the pictorial display 504 may provide application content based on various other sensing inputs measured by mobile device 102. In a non-limiting example, the application content 502 and indications 506, 508 can include still or animated images, graphics, or text that pertain to aligning device 102 to a proposed capture path or angle of position of the mobile device. The angle of position of the mobile device 102 may be represented by a measurement in degrees rotated from a plane orthogonal to a front face of a camera lens on the mobile device 102 and a measurement of degrees rotated from a plane parallel to the face of the camera lens. For example, the indications may provide alignment information and include directions to a user to move the mobile device from a tilt angle of about 30 degrees to a zero-degree tilt angle with reference to a plane orthogonal to a front face of a camera lens on the mobile device 102. In some implementations, the angle of position of the mobile device 102 is represented in a graphic in the device 102 screen that provides azimuth angles (shown by indicators 506 and 508) with respect to a ground plane 512a and a capture plane 512b. In general, the wherein the angle of position of the mobile device is represented in a graphic in the device screen 102 showing a semi-transparent image that provides azimuth angles with respect to a ground plane and a plane associated with the source capture path. In some implementations, the semi-transparent image is combined with the composite image described above.

In another non-limiting example, the application content 502 and/or indications 506, 508 may include an indicator such as a flashing arrow, an icon, and/or so forth, that indicates the user to move the mobile device 102 up or down, left or right, to maintain a capture path that is displayed in the screen of device 102 with the indications. The indicator can, for example, stop flashing or disappear in response to the user correcting her particular capture path. Other indication shapes and content are possible.

In some implementations, the mobile device 102 provides and displays the application content 502 and/or indications 506, 508 in response to detecting that a particular sweep performed by the user is insufficient to use for 3D image stitching. In such a case, the mobile device 102 can direct the user to perform additional sweeps using the same orientation or a different orientation. Similarly, the mobile device 102 can direct the user to perform a number of sweeps at different tilt angles.

In general, indications (e.g., 506, 508) can be provided on a display associated with mobile device 102. The indications may be displayed in an application that may overlay image content being captured. The indications may direct a user of the mobile device 102 to hold the device 102 at a particular angle of position while performing the additional sweeps. The additional sweeps can, for example, be performed with a camera lens of the mobile device facing perpendicular to a ground plane associated with a scene. In some examples, the additional sweeps can be directed at performing image capture using circular (e.g., substantially circular) capture paths (parallel to (e.g., substantially parallel to) the ground, for example) with a first path at a level at or near a user's outward extended arm (holding the mobile device) and sweeping around to capture the scene. The indications can direct the user to perform subsequent sweeps of a capture path that is above or below this path. For example, to perform additional sweeps, the angle of position may be updated in the screen of the mobile device to direct the user to perform specific sweeps of a similar or different capture paths to capture images of the scene. An example of an updated angle of position may include tilting the camera lens at an angle of about forty degrees backward from the capture path that is parallel to (e.g., substantially parallel to) the ground. Another example of an updated angle of position may include titling the camera lens at about forty degrees forward from the capture path that is substantially parallel to the ground. Combining image content from each of the above sweeps may allow system 100 to generate a spherical representation of the scene. Such a representation can be used to provide stereoscopic images in a 3D VR environment.

In some implementations, multiple sweeps of a particular scene can be guided by device 102 to ensure subsequent sweeps are captured using nearly the same orientation as previous sweeps, but at a different tilt angle. These similar sweeps each provide an individual omnistereo image/panorama that can be stitched together using a linear stitching seam over a horizontal line of pixels in the image, for example. In the event that differences occur in the multiple sweeps, optical flow techniques (as described herein) can be used to find correspondence between the sweeps of the scene. The optical flow can be used to blend the multiple sweeps together.

In some implementations, the mobile device 102 provides and displays the application content 502 and indications 506, 508 in response to detecting, during capture, that a sweep of the scene traversed by the mobile device 102 is non-orthogonal to a proposed capture path indicated in the screen of device 102. In this example, as the user modifies her capture path or device orientation, the mobile device 102 may provide updated correction indicators or information in the screen of device 102. In some implementations, the updated information may include additional prompts to adjust the device 102 to match the capture path 402. In some implementations, the updated information may include graphics, icons, textual instructions, sounds, or additional indicators intended to direct the user to adjust the device 102. For example, the mobile device 102 may receive, during capture, an indication in the screen of device 102 corresponding to application content 502, to perform a sweep at a slower moving pace or a faster moving pace. In other implementations, the application content 502 in the screen may cease from being displayed as the user adjusts the capture path to a path that is acceptable to particular specifications configured in the mobile device 102.

Figure 6:
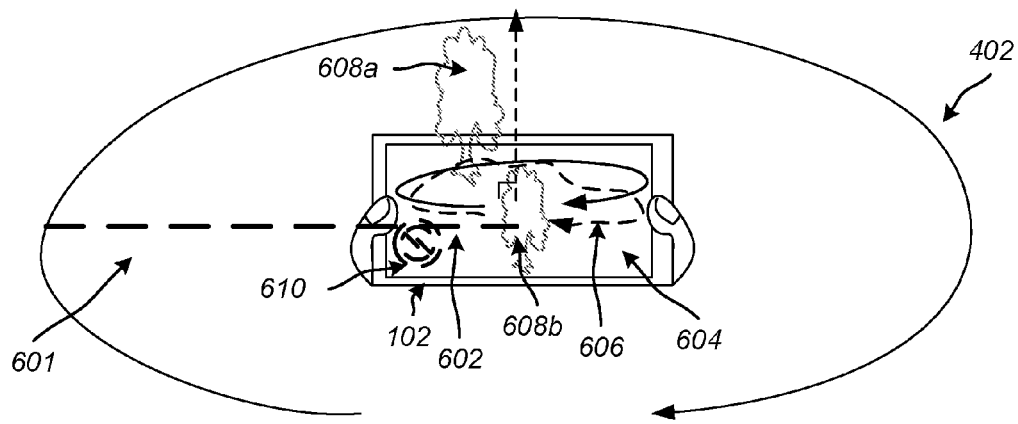
FIG. 6 is a diagram depicting an example of a mobile device during a capture of images.

FIG. 6 is a diagram depicting an example of content 602 in a screen 604 of a mobile device 102 during a capture of images. Here, the mobile device may be mobile device 102 (FIG. 1). A user may be operating mobile device 102 using the onboard camera (e.g., camera 201). In this example, the user is in the center of the scene and sweeping the capture path to capture images of the scene surrounding (e.g., at least partially surrounding) the user. The capture path 402 is shown with a radius 601 of about 10 centimeters to about 35 centimeters. In some implementations, the radius can be varied as the images are captured along a capture path. For example, since a user is operating the mobile device manually in this example, the radius 601 may naturally vary as the user's sweep varies based on her grip and physical movements. In this example, the user may be traversing a capture path 606 to capture images of a scene. As shown, the scene includes a tree 608a and any surrounding horizon, ground, and sky that may be captured by the camera on mobile device 102. Portions of the scene are depicted on device 102 as the user sweeps a capture path to capture the scene. The mobile device 102 is shown capturing a portion of the scene with tree 608a causing an image of tree 608a to be displayed in the display screen 604, as tree 608b. In addition, the user's capture path 606 is shown on the screen 604. As the user pans or sweeps device 102 around capture path 606, the device may detect that the user's path 606 is not accurate enough to provide images that can be configured to properly represent the scene in a 3D stereoscopic and panoramic context. That is, the device 102 can detect whether an orientation, a sweep speed, a mobile device angle, or other variable will cause the scene to be displayed inaccurately in a 3D VR environment, for example.

At some point, an application (running on device 102) can detect the position, orientation, and/or angle of mobile device 102 during capture along the capture path 606. In response to detecting that mobile device 102 is sweeping a capture path that does not match capture path 402, for example, the application can display application content to provide an indication that the device 102 is capturing images improperly. For example, FIG. 6 shows a symbol 610 with a circle and a backslash indicating a "no sign," that can notify the user that she is performing the image capture in a manner that device 102 does not expect. One example reason for receiving symbol 610 may be a capture speed violation, in which the user is simply sweeping the capture path around the scene too quickly for the device 102 to capture and process particular scenery.

Figure 7:
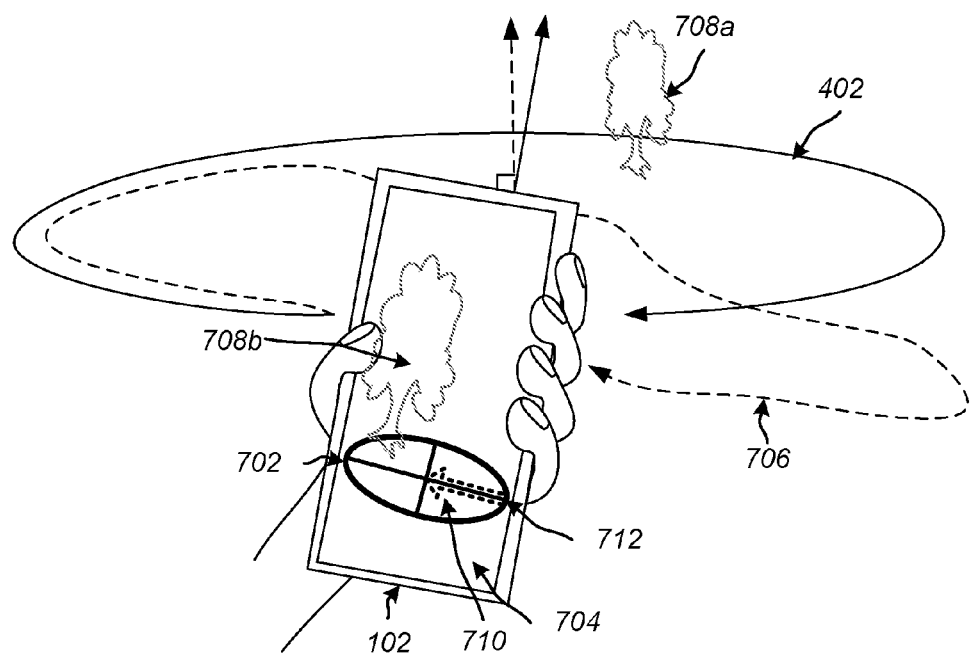
FIG. 7 is a diagram depicting another example of a mobile device during a capture of images.

FIG. 7 is a diagram depicting another example of content 702 in a screen 704 of a mobile device during a capture of images. Here, the mobile device may be mobile device 102 (FIG. 1). A user may be operating mobile device 102 using the onboard camera. In this example, the user is capturing image content with the device 102 in a vertical orientation while is traversing a capture path 706 to capture images of a scene. As shown, the scene includes a tree 708a and any surrounding horizon, ground, and sky that may be captured by the camera on mobile device 102. The scene is depicted on device 102 as the user sweeps to capture portions of the scene. Similar to FIG. 6, the mobile device 102 is shown here capturing a portion of the scene with tree 708a causing an image of tree 708a to show up in the display screen 704, as tree 708b.

At some point, device 102 can detect that the user is capturing content with device 102 at a slightly tilted angle, as shown in FIG. 7. The mobile device 102 can provide indications to the user of device 102, to correct the angle. For example, an indication 710 is shown in the screen of device 102. The indication 710 is an arrow directing the user to tilt the device 102 leftward. Once the device 102 detects the user movement provided a correction to the tilt, then the indication 710 can cease to be displayed. In the event that the user overcorrects the tilt, the indication 710 may be updated to notify the user to tilt the device 102 in a different direction to correct capture orientation. The device 102 can additionally provide application content to assist the user in aligning device to capture specific content. For example, the mobile device 102 can detect that the horizon in the scene is not evenly captured across capture path 706. Namely, device 102 can determine that a deeply tilted device may capture images in a fashion that makes the images difficult to stitch together. Accordingly, device 102 may provide instructions and/or markers to indicate that the user should align the mobile device 102 differently. One example marker includes cross hair 712. Cross hair 712 can be used to assist the user in aligning device 102 with capture path 402, for example. Other markers are possible including a full location grid or map, latitude and longitude coordinates, level/not-level symbols, and other location indicators. Each of these indicators and markers can be displayed in on device 102 to an application capturing image content. In this fashion, the image content can be viewed while correction mechanisms are displayed.

Figure 8:
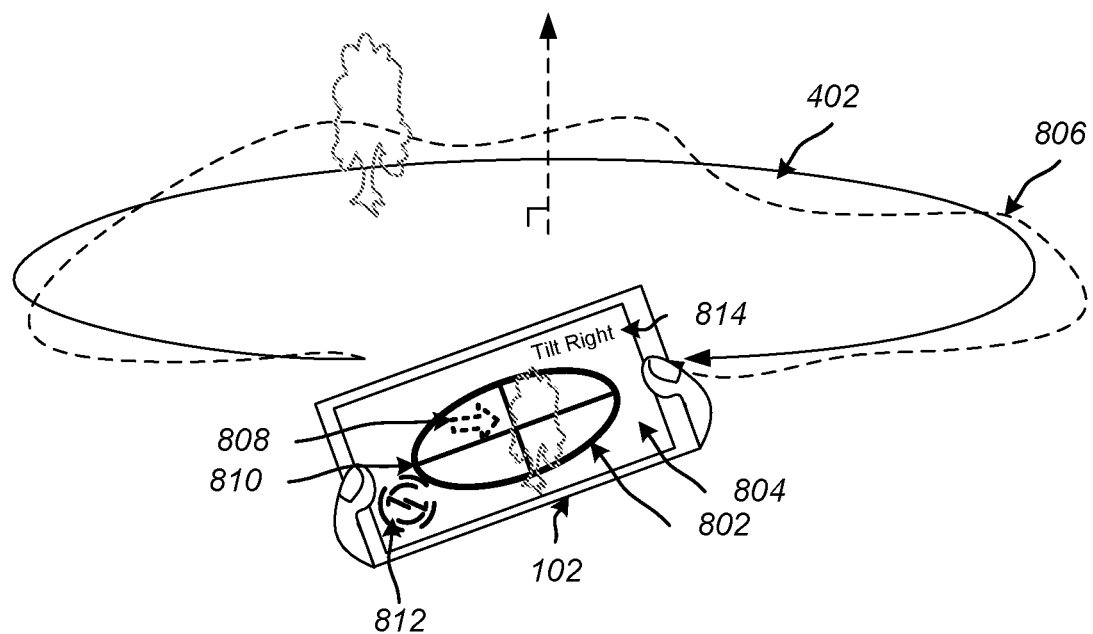
FIG. 8 is a diagram depicting yet another example of a mobile device during a capture of images.

FIG. 8 is a diagram depicting yet another example of content 802 in a screen 804 of a mobile device during a capture of images. In this example, the mobile device may be mobile device 102 (FIG. 1). A user may be operating mobile device 102 using the onboard camera. In this example, the user may be traversing a capture path 806 to capture images of a scene. The mobile device 102 can detect that the user is angling or tilting device 102 at an angle that may not provide usable images for generating 3D stereoscopic content. Accordingly, an application running on device 102 can provide indicators and content that can prompt a user to change the course of her capture path, for example. The indicators shown in FIG. 8 include an arrow 808 inside a cross hair 810, a no-sign 812, and a textual instruction "Tilt Right" 814. Each symbol can indicate to the user of mobile device 102 to carry out an instruction. In some implementations, the symbols indicate the same instruction. For example, the arrow 808 and the textual instruction 814 both indicate to the user that she should tilt the mobile device 102 to the right to correct her capture path or image capture process.

Figure 9:
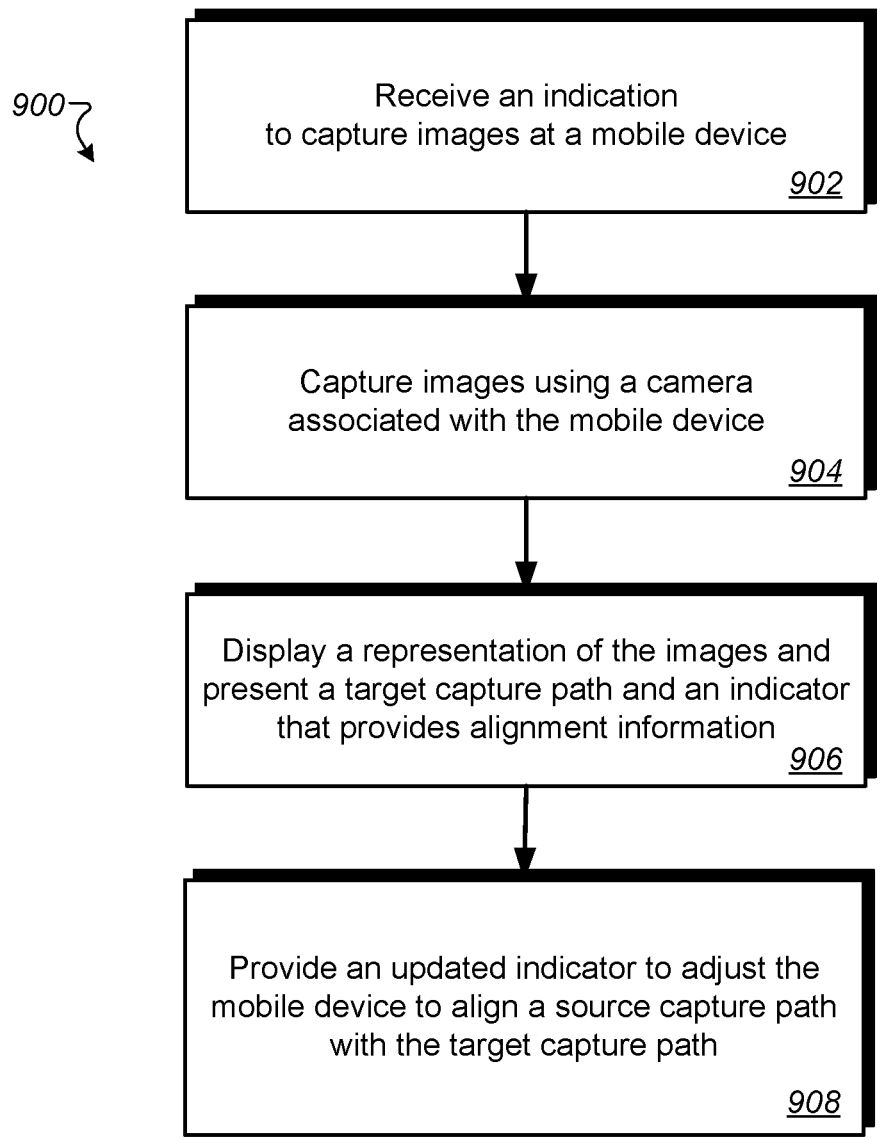
FIG. 9 is a flow chart diagramming one embodiment of a procedure to capture images.

FIG. 9 is a flow chart diagramming one embodiment of a procedure 900 to capture images. In various embodiments, the procedure 900 may be used or produced by the systems such as those of FIGS. 1 and 11.

Block 902 illustrates that, in one embodiment, a mobile device can receive an indication to begin capturing images. For example, a user can access a camera built into or accessible to mobile device 102 by selecting a camera application to begin to capture images of a particular scene. Capturing images of the scene may correspond to recording image content with the mobile device by aligning the mobile device to traverse a particular capture path. Variations in the diameter around the capture path can occur.

At block 904, the mobile device 102 can capture images using the camera. The capture of images can include obtaining images for at least a portion of a circular sweep along a capture path of a scene. For example, mobile device 102 can capture the images while performing a recorded sweep along a circular capture path of the scene. A recorded sweep of the scene can include still image capture and/or video image capture in which the captured content associated with the scene is recorded and stored on device 102 or at a remote computing device, for example. The sweep of the scene can entail a user manually moving mobile device 102 in an arcing motion in a semi-circle or full circle to obtain scene images. The arcing motion may correspond to a sweep around the user's head or body with mobile device 102 pointing outward toward scenery.

At block 906 and during capture, the mobile device 102 can display a representation of the images on the device 102 as well as present a target (proposed) capture path and indicators that provide alignment information that correspond to a source capture path associated with the mobile device movements during image capture. The indicators may include a prompt, a graphic, a sound, or text indicating to the user of the mobile device that an adjustment is requested. The indicators may be related to typical location or alignment protocols including, but not limited to, a full location grid or map, latitude and longitude coordinates, level/not-level symbols, textual location data, and other location indicators.

In general, the source capture path may represent a sweeping motion traversed by the mobile device 102 to capture a plurality of images of a scene along the source capture path. Accordingly, the source capture path may be associated with an orientation of the mobile device during capture. Similarly, the source capture path may also be associated with an angle of position of the mobile device 102. The target capture path may represent a circular-shaped path that may be a predefined or preselected capture path determined by the device 102 or system 100.

At block 908, the indicators that provide alignment information can be provided in the screen of mobile device 102 in response to detecting that portions of a sweep of the scene being performed and traversed by the mobile device 102 (e.g., portions of the source capture path) do not match portions of the target capture path. Such indicators can be provided in real time to the screen of the mobile device 102 during capture. In some implementations, the indicator is provided as part of or in addition to a composite image that includes the target capture path and the indicator as well as the representation of one or more of the plurality of images being captured. The indicator can, for example, include a prompt, to a user of the mobile device, to adjust the mobile device to match all or a portion of her capture path (e.g., the source capture path) to all or a portion of the proposed capture path (e.g., the target capture path).

In some implementations, the process 900 can include receiving additional indicators in the screen of the mobile device. For example, the mobile device 102 can receive, during capture, an indication to perform a particular image capture at a slower moving pace. In another example, the mobile device 102 can receive an indication to perform additional image captures of the scene using an updated angle of position to capture additional content in the scene. The updated angles of position may provide additional image content in which to stitch or blend into a 3D omnistereo scene for purposes of displaying the scene in a VR environment. For example, if the user were to capture images of a scene using a mobile device in a vertical (i.e., portrait) orientation, additional vertical space may be provided in the captured images in contrast to images captured using the device in a horizontal (.i.e., landscape) orientation. In this example, if the user rotated the mobile device away or toward a circumference of a circular capture path, the rays that can be typically used from a circular capture may not be available. That is, if the mobile device 102 is not held facing outward toward a scene approximately tangential to a circular capture path, the images may not stitch or blend accurately to provide a 3D omnistereo version of the scene with 360 degrees of views of the scene.

In some implementations, procedure 900 can include capturing image content and displaying the content in a screen of a mobile device during capture while also displaying, during capture, a pictorial graphic on the screen of the mobile device. The pictorial graphic can, for example, be presented in a semi-transparent overlay of the screen to present a composite of the images under capture and the pictorial graphic (or any other indications) to the user. The pictorial graphic can be configured to provide a target capture path (i.e., a proposed circular capture path for using resulting images to generate 3D omnistereo scenes for a VR environment) and an indicator that provides alignment information corresponding to a source capture path. The alignment information may include a pictorial graphic that represents gyroscope measurements corresponding to movement in a particular angle of position of the mobile device. In some implementations, the pictorial graphic includes at least one indicator that provides a course to match the source capture path associated with the movement of the mobile device to the target capture path.

In some implementations, matching (or mismatching) a portion or all of a particular capture path may be based on a threshold condition. For example, a threshold condition may include having the source capture path mismatch the target path by about 5 percent to about 10 percent of a path traveled around the target capture path. That is, if the device 102 detects that 5 percent to 10 percent of the path traveled by device 102 has deviated more than about 5 to 10 percent, then the device 102 can display the pictorial graphic or other correction indications. In another example, a threshold condition may include having the source capture path mismatch the target path by about 10 percent to about 25 percent. In another example, a threshold condition may include having the source capture path mismatch the target path by about 20 percent to about 40 percent. Mobile device 102 can include configuration settings that enable device 102 to detect deviations from a particular image capture path traversed by the mobile device 102 based on a percentage threshold, a boundary threshold level or percentage, an angle of capture threshold, just to name a few examples.

In general, the source capture path may be associated with movement of the mobile device 102 (i.e., a capture path traversed by a user sweeping a circular motion with the mobile device). The pictorial graphic can be dynamically updated in real-time in response to detecting movement of the mobile device, for example. The pictorial graphic can include multiple portions. For example, the pictorial graphic can include a first portion that depicts a target capture path and a second portion that depicts a source capture path associated with movement of the mobile device (described above). The first and second portions may indicate or instruct a user to follow a particular course to align the second portion with the first portion. In this example, the first portion may be a portion of a circle or an entire circle while the second portion may be deviations from the portion of the circle or deviations from the entire circle. Here, the circle may represent an ideal circular sweeping path in which the mobile device is traversed, by a user, to capture images of a scene.

Figure 10:
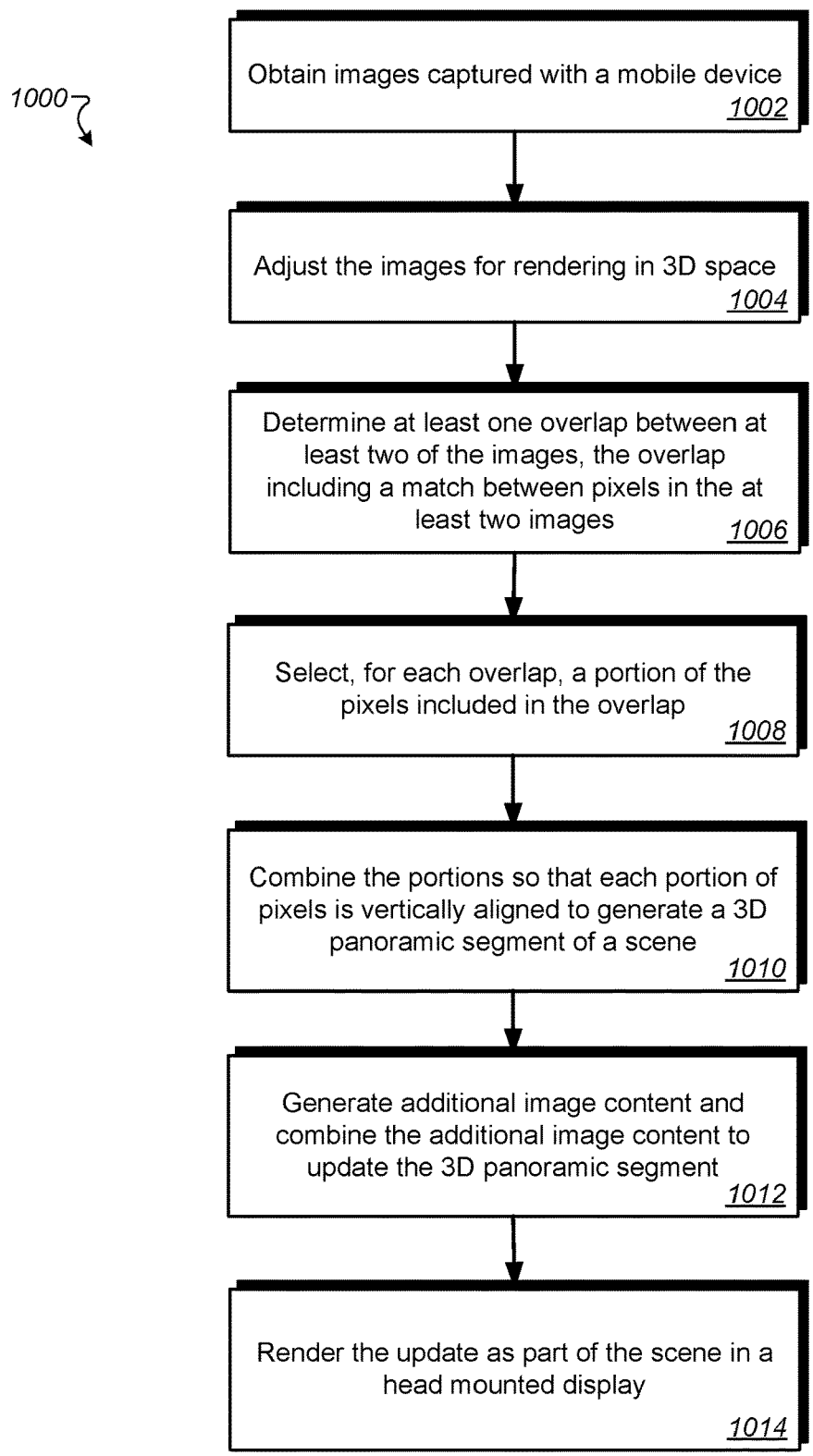
FIG. 10 is a flow chart diagramming one embodiment of a procedure to render images.

FIG. 10 is a flow chart diagramming one embodiment of a procedure 1000 to render images. In various embodiments, the procedure 1000 may be used or produced by the systems such as those of FIGS. 1 and 11.

Block 1002 illustrates that, in one embodiment, the image processing system 106 can obtain images captured with a mobile device. The obtained images may include content captured from multiple points around a 360-degree circle. The circle may represent a capture path in which the mobile device can be configured to sweep to obtain the images. In one example, the 360-degree circle may represent a variable capture path with a diameter ranging from about 10 centimeters to about 75 centimeters. In the event that the capture path has a diameter of about 10 centimeters, the obtained images can be obtained with a horizontal field of view of about 90 degrees.

In some implementations, the obtained images may include a plurality of consecutive image frames of a particular scene. In other implementations, the obtained images may include a plurality of disjointed or non-consecutive image frames. In yet other implementations, the obtained images may include a combination of consecutive and non-consecutive sets of images.

In a non-limiting example, the obtained images may include a set of images representing a scene from zero degrees to 25 degrees, a set of images representing the scene from 30 degrees to 300 degrees, and another set of images representing the scene from 310 degrees to 349 degrees around the circle. These sets of images can be used by system 106 to generate a 360 degree, stereoscopic 3D scene. Generating the 360-degree, stereoscopic 3D scene can include adjusting a number of images to stitch or blend the sets of images.

At block 1004, the system 106 can adjust the obtained images (or sets of images) for rendering in 3D space. The 3D space may be represented as space in a VR environment. Adjusting the obtained images can include determining at least one overlap between at least two of the images, at block 1006. The overlap may include a match between pixels in the at least two images. For example, the system 106 can analyze columns of pixels within image frames in the sets of images and determine whether the image content in a first column of pixels matches image content in a second column of pixels. If an overlap is found, the system 106 can select, for each overlap, a portion of the pixels included in the overlap at block 1008. The selected portions of pixels corresponding to an overlap can be combined at block 1010 so that each portion of pixels is vertically aligned to generate a segment of a scene.

In response to determining that there is not an overlap between the at least two images, the system 106 can generate additional image content to be blended between the at least two images, at block 1012. The system 106 can then combine the additional image content to update the segment. Combining the additional image content may include blending columns from two or more images to remove artifacts in the images. Artifacts may include, but are not limited to, misalignment errors based at least in part on a pose associated with capture. In some implementations, procedure 1000 can also include step to adjust the images for rendering in 3D space by correcting for (i) lateral roll movement that occurred at capture, (ii) non-conformal camera arc movement that occurred at capture, or (iii) inconsistent radius measurements that occurred at capture.

At block 1014, system 106 can provide the update of the segment for rendering and display in a head-mounted display used in a VR environment, for example.

Figure 11:
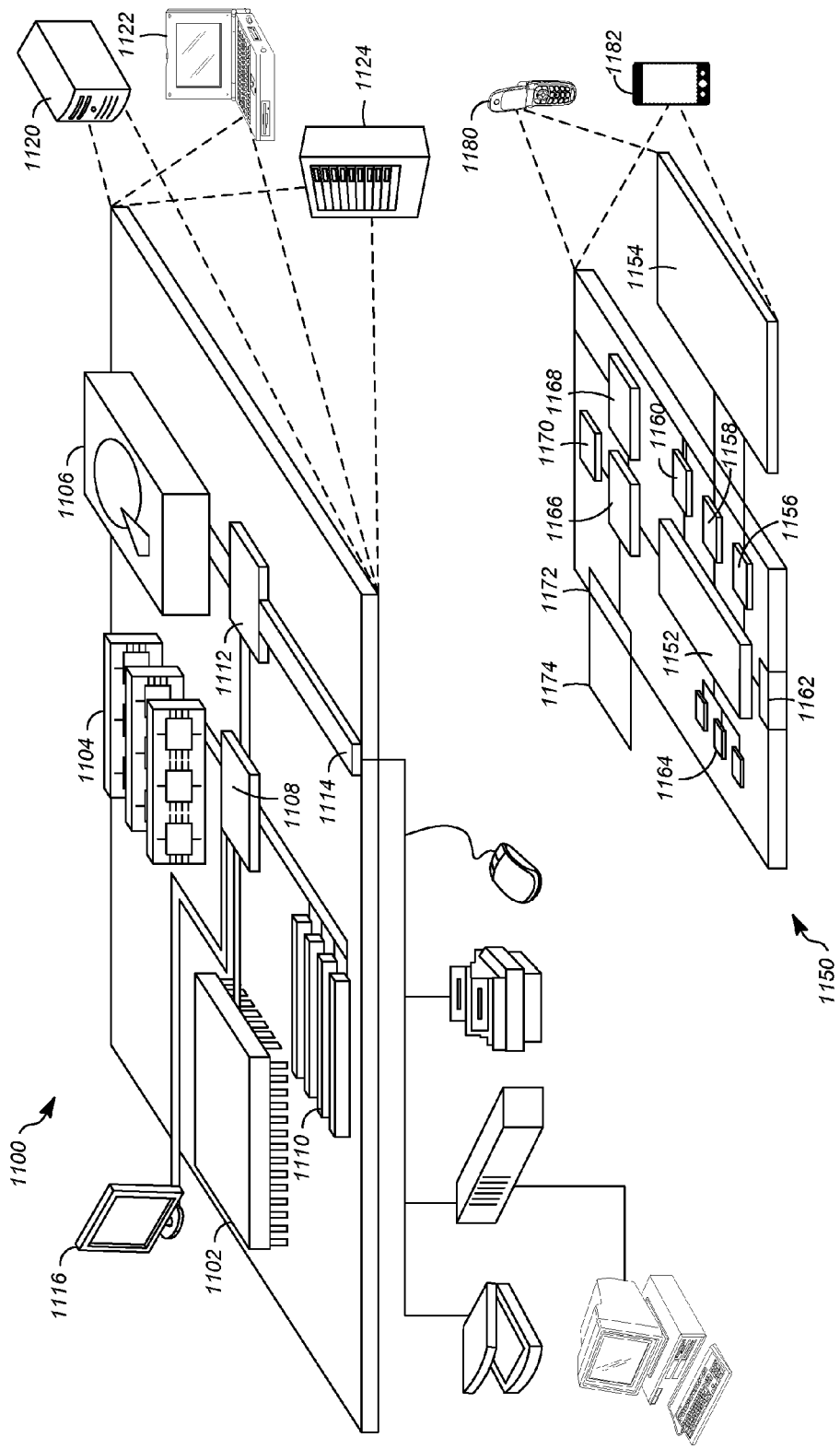
FIG. 11 shows an example of a computer device and a mobile computer device that can be used to implement the techniques described here.

FIG. 11 shows an example of a generic computer device 1100 and a generic mobile computer device 1150, which may be used with the techniques described here. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152 that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, Wi-Fi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving, at a mobile device, an indication to capture a plurality of images of a scene;
   capturing the plurality of images using a camera associated with the mobile device;
   displaying on a screen of the mobile device and during capture of the plurality of images, a representation of the plurality of images and presenting, in the screen, a graphic that includes a target capture path and an indicator that provides alignment information corresponding to a source capture path associated with the mobile device during capture of the plurality of images; and
   in response to detecting, during capture, that a first portion of the source capture path does not match a corresponding portion of the target capture path, the match being based at least in part on a threshold condition, providing an updated graphic in the screen indicating a direction to align the first portion of the source capture path with the corresponding portion of the target capture path and a prompt, to a user of the mobile device, to adjust the mobile device to align the first portion of the source capture path with the corresponding portion of the target capture path.

2. The method of claim 1, wherein the source capture path comprises a sweeping motion traversed by the mobile device to capture the plurality of images of the scene, the source capture path being associated with an orientation and an angle of position of the mobile device.

3. The method of claim 1, wherein the target capture path comprises a circular-shaped path and capturing the plurality of images corresponds to recording image content with the mobile device by aligning the mobile device to traverse the target capture path having a diameter of about 10 centimeters to about 75 centimeters.

4. The method of claim 1, wherein the alignment information comprises a graphical representation of gyroscope measurements corresponding to movement associated with an orientation and an angle of position of the mobile device.

5. The method of claim 4, wherein the angle of position of the mobile device is represented as a graphic in a semi-transparent image that provides azimuth angles with respect to a ground plane and a plane associated with the source capture path and wherein the semi-transparent image is combined with the graphic or the updated graphic.

6. The method of claim 4, wherein the angle of position of the mobile device comprises a measurement of degrees rotated from a plane orthogonal to a front face of a camera lens on the mobile device and a measurement of degrees rotated from a plane parallel to the face of the camera lens.

7. The method of claim 1, further comprising receiving, during capture, an indication in the screen to capture the images at a slower pace.

8. The method of claim 1, further comprising receiving an indication, in the screen, to perform additional image capture of the scene using an updated angle of position to capture additional image content in the scene.

9. The method of claim 8, wherein the indication in the screen directs a user of the mobile device to hold the mobile device at the updated angle of position while performing the additional image capture; and
   wherein the additional image capture is performed with a camera lens of the mobile device facing perpendicular to a ground plane associated with the scene and the updated angle of position comprises (i) an about forty degree backward tilt of the camera lens or (ii) an about forty degree forward tilt of the camera lens.

10. A non-transitory, machine-readable medium having instructions stored thereon, the instructions, when executed by a processor, cause a computing device to:
    receive, at a mobile device, an indication to capture a plurality of images of a scene;
    capture the plurality of images using a camera associated with the mobile device;
    display on a screen of the mobile device and during capture of the plurality of images, a representation of the plurality of images and presenting, in the screen, a graphic that includes a target capture path and an indicator that provides alignment information corresponding to a source capture path associated with the mobile device during capture of the plurality of images; and
    in response to detecting, during capture, that a first portion of the source capture path does not match a corresponding portion of the target capture path, the match being based at least in part on a threshold condition, providing an updated graphic in the screen indicating a direction to align the first portion of the source capture path with the corresponding portion of the target capture path and a prompt, to a user of the mobile device, to adjust the mobile device to align the first portion of the source capture path with the corresponding portion of the target capture path.

11. The medium of claim 10, wherein the source capture path comprises a sweeping motion traversed by the mobile device to capture the plurality of images of the scene, the source capture path being associated with an orientation and an angle of position of the mobile device.

12. The medium of claim 10, wherein the alignment information comprises a graphical representation of gyroscope measurements corresponding to movement associated with an orientation and an angle of position of the mobile device.

13. The medium of claim 10, further comprising receiving an indication, in the screen, to perform additional image capture of the scene using an updated angle of position to capture additional image content in the scene.

14. The medium of claim 13, wherein the indication in the screen directs a user of the mobile device to hold the mobile device at the updated angle of position while performing the additional image capture; and
    wherein the additional image capture is performed with a camera lens of the mobile device facing perpendicular to a ground plane associated with the scene and the updated angle of position comprises (i) an about forty degree backward tilt of the camera lens or (ii) an about forty degree forward tilt of the camera lens.

15. A system comprising:
    at least one processor;
    memory storing instructions that, when executed by the at least one processor, cause the system to perform operations including:
       capturing image content, the content displayed in a screen of a mobile device during capture;
       displaying, during capture, a graphic on the screen of the mobile device, the graphic configured to provide a target capture path and an indicator that provides alignment information corresponding to a source capture path associated with movement of the mobile device; and
       in response to detecting, during image capture, that a first portion of the source capture path associated with the movement of the mobile device is different than a corresponding portion of the target capture path, providing an updated graphic in the screen indicating a direction to align the first portion of the source capture path with the corresponding portion of the target capture path and a prompt, to a user of the mobile device, to adjust the mobile device to match the first portion of the source capture path to the corresponding portion of the target capture path.

16. The system of claim 15, wherein the graphic dynamically updates in real-time in response to detecting movement of the mobile device.

17. The system of claim 15, wherein the target capture path is a circle and the first portion of the source capture path depicts deviations from the circle.

18. The system of claim 15, wherein the alignment information comprises a graphic of gyroscope measurements corresponding to movement in an angle of position of the mobile device.

19. The system of claim 15, further comprising receiving an indication to perform additional image capture using an updated angle of position to capture additional image content.

20. The system of claim 15, wherein the source capture path comprises a sweeping motion traversed by the mobile device to capture the image content, the source capture path being associated with an orientation and an angle of position of the mobile device.

* * * * *